US008413065B2

(12) United States Patent
Horodezky

(10) Patent No.: US 8,413,065 B2
(45) Date of Patent: Apr. 2, 2013

(54) USER INTERFACE METHODS FOR ENDING AN APPLICATION

(75) Inventor: Samuel J. Horodezky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 12/554,973

(22) Filed: Sep. 7, 2009

(65) Prior Publication Data

US 2011/0057953 A1    Mar. 10, 2011

(51) Int. Cl.
*G06F 3/048* (2006.01)
(52) U.S. Cl. .......................... 715/772; 715/744; 715/863
(58) Field of Classification Search .................. 715/863, 715/772, 867, 744; 382/255, 299
See application file for complete search history.

(56) References Cited

U.S. PATENT DOCUMENTS

| | | | |
|---|---|---|---|
| 7,290,285 B2 * | 10/2007 | McCurdy et al. ............... | 726/27 |
| 2003/0210286 A1 * | 11/2003 | Gerpheide et al. ............ | 345/863 |
| 2008/0168403 A1 | 7/2008 | Westerman et al. | |
| 2009/0241067 A1 * | 9/2009 | Dubs et al. .................... | 715/850 |
| 2009/0300554 A1 * | 12/2009 | Kallinen ....................... | 715/863 |
| 2010/0328224 A1 * | 12/2010 | Kerr et al. .................... | 345/173 |

OTHER PUBLICATIONS

International Search Report and Written Opinion—PCT/US2010/048008, International Search Authority—European Patent Office—Mar. 1, 2011.

* cited by examiner

*Primary Examiner* — Namitha Pillai
(74) *Attorney, Agent, or Firm* — James T. Hagler

(57) ABSTRACT

Methods and devices provide an efficient user interface for initiating a function by detecting an ellipsoidal continuous touch path on a touch surface of a computing device. In an embodiment the initiated function may end an application. A user may initiate the function operation by tracing an ellipsoidal shape (e.g., a circle) a touchscreen or touchpad. A display image may be contorted to inform the user about the progress towards accomplishing the function. The function operation of contorting the display image may begin at a minimum measure of the traced path and complete at a maximum measure of the traced path. In an embodiment, terminating an application and returning to the home display may be achieved in response to a clockwise path trace and minimizing of an application and returning to home display may be achieved in response to a counterclockwise path trace, or vice versa.

20 Claims, 10 Drawing Sheets

USER INTERFACE METHODS FOR ENDING AN APPLICATION

FIELD OF THE INVENTION

The present invention relates generally to computer user interface systems and more particularly to user systems providing functionality to end an application.

BACKGROUND

Personal computing devices (e.g. cell phones, PDAs, laptops, gaming devices) provide users with increasing functionality and data storage. Personal computing devices serve as personal organizers, storing documents, photographs, videos and music, and serving as portals to the Internet and electronic mail. As technology advances, computing devices shrink in size and reduce in weight to become even more portable. However, as these devices become smaller and lighter, the space available for the display also reduces in size. Therefore, to provide users with the largest available display area, electronic device manufacturers are reducing the number of mechanical keys available on the computing device. The fewer keys available on the computing devices, the more space there is for larger displays.

As mechanical keys disappear from the face of computing devices, the functions linked to physical keys are being allocated to virtual keys that appear on a touchscreen display. Users can perform the functions that used to belong to the mechanical keys by pressing on the virtual keys that appear on the touchscreen display. However, because virtual keys are not always present on the display and in some instances must be recalled during the operation of an application, the use of virtual keys has drawbacks.

SUMMARY

Various embodiments provide methods and devices for enabling users of a computing device to end present applications by tracing a circular or ellipsoidal shape on a touchscreen. In an embodiment, the computing device receives a series of user pointing events from a user interface, such as a touchscreen or touchpad, and examines the event data to determine the shape and direction of a path traced in a continuous pointing event. If the traced path is circular or ellipsoidal in shape an application ending function may be initiated by which a present application may be ended and home image may be displayed. Depending on the direction of the traced path, the application may be ended in different manners. In an embodiment, an ellipsoid-shaped path traced in the clockwise direction may be interpreted to terminate the present application and return to a home image, while an ellipsoid-shaped path traced in the counterclockwise direction may be interpreted to minimize the present application (without terminating it) and return to the home image. In an embodiment, path lengths may be used to determine rotation angles that may be required to end a present application. In a further embodiment, sensory indicators, such as display image distortions, may be used to inform the user about the progress towards ending the present application based upon rotation angles while the user traces an ellipsoidal path event on the touchscreen display.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
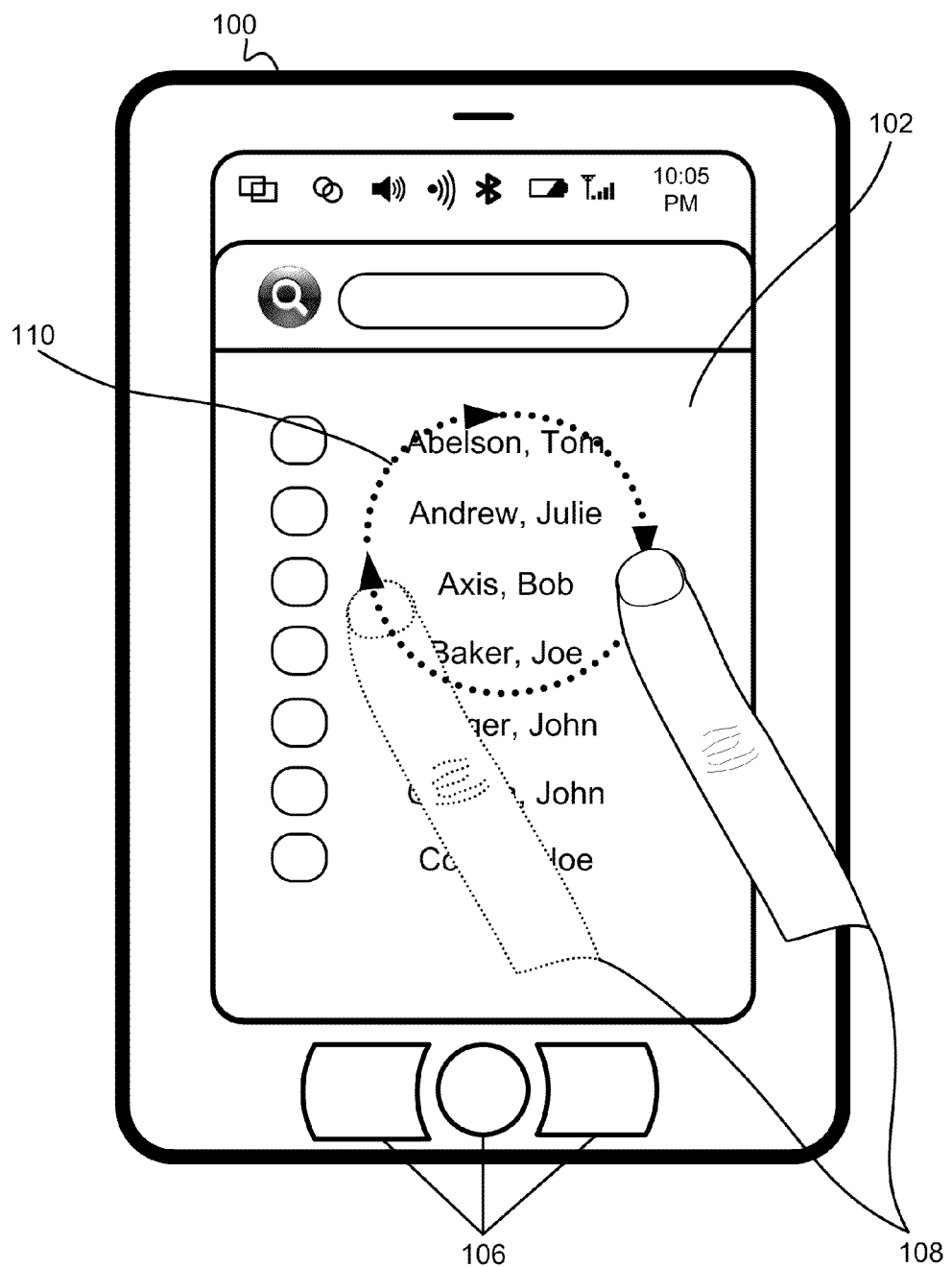
FIG. 1 is a frontal view of a portable computing device illustrating application ending functionality activated by a finger moving in a clockwise direction on a touchscreen display.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, a "touchscreen" is a touch sensing input device or a touch sensitive input device with an associated image display. As used herein, a "touchpad" is a touch sensing input device without an associated image display. A touchpad, for example, can be implemented on any surface of an electronic device outside the image display area. Touchscreens and touchpads are generically referred to herein as a "touch surface." Touch surfaces may be integral parts of an electronic device, such as a touchscreen display, or a separate module, such as a touchpad, which can be coupled to the electronic device by a wired or wireless data link. Touchscreen, touchpad and touch surface may be used interchangeably hereinafter.

As used herein, the terms "personal electronic device," "computing device" and "portable computing device" refer to any one or all of cellular telephones, personal data assistants (PDA's), palm-top computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices which include a programmable processor, memory and a connected or integral touch surface or other pointing device (e.g., a computer mouse). In an example embodiment used to illustrate various aspects of the present invention the electronic device is a cellular telephone including an integral touchscreen display. However, this embodiment is present merely as one example implementation of the various embodiments, and as such is not intended to exclude other possible implementations of the subject matter recited in the claims.

As used herein a "touch event" refers to a detected user input on a touch surface which may include information regarding location or relative location of the touch. For example, on a touchscreen or touchpad user interface device, a touch event refers to the detection of a user touching the device and may include information regarding the location on the device being touched.

As used herein "single continuous touch event" refers to any input received on a user interface device (e.g., touchscreen or touchpad) in which the touch event (e.g., touch of touchscreen or touchpad) continues without significant interruption. Using the example of a touchscreen user interface, a single continuous touch event occurs so long as a user's finger continues to touch the surface.

As used herein the term "path" refers to a sequence of touch event locations that trace a path within a graphical user interface (GUI) display during a single continuous touch event. Also, as used herein the term "path event" refers to a detected user input on a touch surface which traces a path during a single continuous touch event. A path event may include information regarding the locations or relative locations (e.g., within a GUI display) of the touch events which constitute the traced path.

As used herein the terms "ellipsoid-shape" and "ellipsoidal" refer to any path traced in a single continuous touch event that approximately closes on itself, such as a circle, ellipse, triangle, square, rectangle, or polygon. An "ellipsoid-shape" may be detected before the path closes on itself and may include paths that overlap without closing such as a spiral path traced in a single continuous touch event. A single continuous touch event can be differentiated from other discrete touch events such as taps on a touchscreen for selecting items or activating an icon.

The various embodiment methods and devices provide an intuitive user interface for initiating an application ending function. Users simply trace a path on a touchscreen or touch surface in a single continuous touch event. For example, users may use their fingers to touch and trace a circle on a touchscreen of a portable computing device. The processor of a computing device may be programmed to recognize paths traced in a single continuous touch event as an ellipsoid-shape and, in response, end the operation of an application. An ellipsoid-shaped path may then be differentiated from other path shapes, such as movement of a finger in one direction on a touchscreen for panning or pinching (e.g., in the case of the iPhone® two-finger pinch commands for zooming display images).

In the various embodiments the application ending functionality may be enabled automatically. For example, the GUI software may include instructions for automatically recognizing a close-shaped path traced in a single continuous touch event and activating the application ending functionality. Automatic activation of the application ending features may be provided with any application. Also, whenever an application is activated, a GUI may automatically enable the application ending functionality to allow the user to terminate the application by tracing a closed-shape path on the touchscreen.

In some embodiments the application ending functionality or end mode may be automatically disabled such as may be useful in applications in which a close-shaped path traced in a single continuous touch event may be common (e.g., drawing programs) or used for other functions (e.g. zooming or rotating images). The user may be allowed to manually enable the application ending functionality when required. To manually enable or activate the application ending function in such applications, a user may select and activate the application ending function by pressing a button or activating an icon on a GUI display. In an exemplary embodiment, the application ending operation may be assigned to a soft key which the user may activate (e.g., by pressing or clicking) to launch the application ending functionality. In another exemplary embodiment, the application ending functionality may be activated by a user command. For example, the user may use a voice command such as "ACTIVATE APPLICATION ENDING" to enable the application ending mode. Once activated, the application ending functionality may be used in the manner described below.

Using the application ending functionality a user may terminate or minimize (without termination) an application to return to the home display by beginning a single continuous touch event (e.g., by touching a touchscreen or touchpad) and tracing a closed shape, such as a circle, as illustrated in FIG. 1. The direction, length, and rotation angle of the path traced in single continuous touch event may control the initiation and progress of the application ending functionality. The direction of the path traced in the single continuous touch event may determine the method by which an application is ended (i.e., terminating or minimizing the application). For example, to terminate an application and return to the home display, the user may trace a circle in the clockwise direction using a touchscreen in a single continuous touch event. Similarly, to minimize the application (i.e., keep the application open and running in the background) and return to the home display, the user may trace a circle in the counterclockwise direction using the touchscreen with a single continuous touch event. The direction of the traced circle for purposes of activating either the close or minimize functions is arbitrary and may be reversed from the example description, and may be configured as a user-definable preference (e.g., to accommodate left or right handedness).

The application ending functionality may depend upon or be triggered by the rotation angle traced in the single continuous touch event. This rotation angle may be calculated based upon the length of the traced path or upon a geometric analysis of the traced path. Thus, an application may be ended when a predetermined rotation angle is traced. For example, the application ending functionality may be assigned to a single loop or ellipsoid path which achieves a rotation angle of 360°. Alternatively, the ending functionality may be assigned to multiple loops or ellipsoid paths (i.e., two or more rotations through 360°) traced on the touchscreen.

Further, the application ending functionality may be executed in multiple phases, with each phase being triggered by a different rotation angle. For example, when a traced path with a rotation angle of 180° is detected, the application ending process may commence by generating a perceptible indicia to inform a user that the application ending function is being selected, with the functionality completing (i.e., closing the application and returning to the home display) when the traced path reaches a rotation angle of 360°. Other rotation angles which may fall within a range between the initiation and completion rotation angles may be linked to other sub-functions, such as alerting the user about the application ending process. For example, the application ending functionality may contort, swirl or fade the display image of the application which is being ended prior to completely ending the application and returning to home display. The degree to which the display image is contorted may depend on the rotation angles achieved in the path of the touch event. For example, the degree of contortion may increase as the rotation angles approach 360° until the application is ended at 360° as illustrated in FIGS. 2A-2D and 3.

Further, before achieving a rotation angle of 360°, a user may be allowed to reverse or halt the application ending functionality. For example, if at any time before achieving a maximum rotation angle, a user stops the touch path event (i.e. by either stopping the touch movement or lifting the finger off the touch surface) the application ending process may abort leaving the present application open on the display. The visual indicia of the ending process (e.g., a swirl distortion linked to the angle of rotation) combined with the ability to abort the function provides users with the visual feedback to recognize when a function is about to be ended so they can confirm their intent or change their mind without a further step of presenting an "Are You Sure?" prompt to which the user must respond.

The gradual image distortions may be tied to the traced path length or the traced rotation angle. Path length may be measured from the starting point of the single continuous touch event (i.e., the GUI location of the first point where the touchscreen or touch pad was touched or the mouse button was depressed). The rotation angle may be determined in terms of the number of radians about an estimated center point spanned by the ellipsoidal path. Also in a preferred embodiment, the degree of contortion applied to an image is linearly dependent upon the length of the traced path (or radians spanned). Thus, in a preferred embodiment, the further around a circle that the user's traces the greater the image distortion, and when the user stops tracing a path (i.e., pauses without lifting his/her finger from the touchscreen) the image remains at the present state of contortion.

The application ending functionality may be implemented on any touch surface. In a particularly useful application, the touch surface is a touchscreen that is touched by a finger, since touchscreens are generally superimposed on a display image, enabling users to interact with the display image with the touch of a finger. In such applications, the user interacts with an image by touching the touchscreen with a finger and tracing an elliptical path (thus the user's finger activating the touchscreen serves as the pointing device). Touchscreen touch events acquisition (i.e., detection of a finger touch on a touchscreen) and processing are well known, such as disclosed in U.S. Pat. No. 6,323,846 the entire contents of which are hereby incorporated by reference.

Referring to FIG. 1, an example computing device 100 includes a touchscreen display 102 and function keys 106 for interfacing with a graphical user interface. In the illustrated example, the computing device 100 is running an address book application which displays the names of several contacts on the touchscreen display 102.

In an embodiment, a user can end the address book application and return to the home display by touching the touchscreen 106 with, for example, a finger 108 and moving the finger 108 to trace a closed path (e.g., a circle) in a single continuous touch event (i.e., without raising the finger from the touchscreen display 102). An example direction and the general shape of the path that a user may trace are shown by a dotted circle 110 with arrows. The dotted circle 110 is shown to only indicate the shape and direction of the finger 108 movement and is not included as part of the touchscreen display 102 in the embodiment illustrated in FIG. 1.

As mentioned above, the application ending function may be configured to recognize a minimum rotation angle based upon the path event traced. Once a minimum rotation angle is achieved, the application ending function may be initiated to inform the user about the progression of the ending function by providing an indication (e.g., visual contortion of the present image, sound effects or vibrations) linked to the ending function. Additionally, the application ending function may be configured to recognize a maximum rotation angle based upon the path event traced at which angle the present application may be ended and the user is returned to the home display. For example, a minimum rotation angle may be set at 180° (i.e., half circle) at which the ending function may be started and a maximum rotation angle may be set at 360° (i.e., a full circle) at which point the application is ended. A user may use his/her finger 108 to trace a half circle on the touchscreen to reach the rotation angle 180°, as shown in FIG. 1. No change will be shown on the display image as long as the rotation angle remains less than 180° in this example implementation. Once the half circle is complete and a higher than 180° rotation angle is reached, the application ending function may activate and begin contorting the display, such as swirling the present image to provide the user with visual indications about the progress of the application ending function as illustrated in FIGS. 2A-2D.

Figures 2A, 2B:
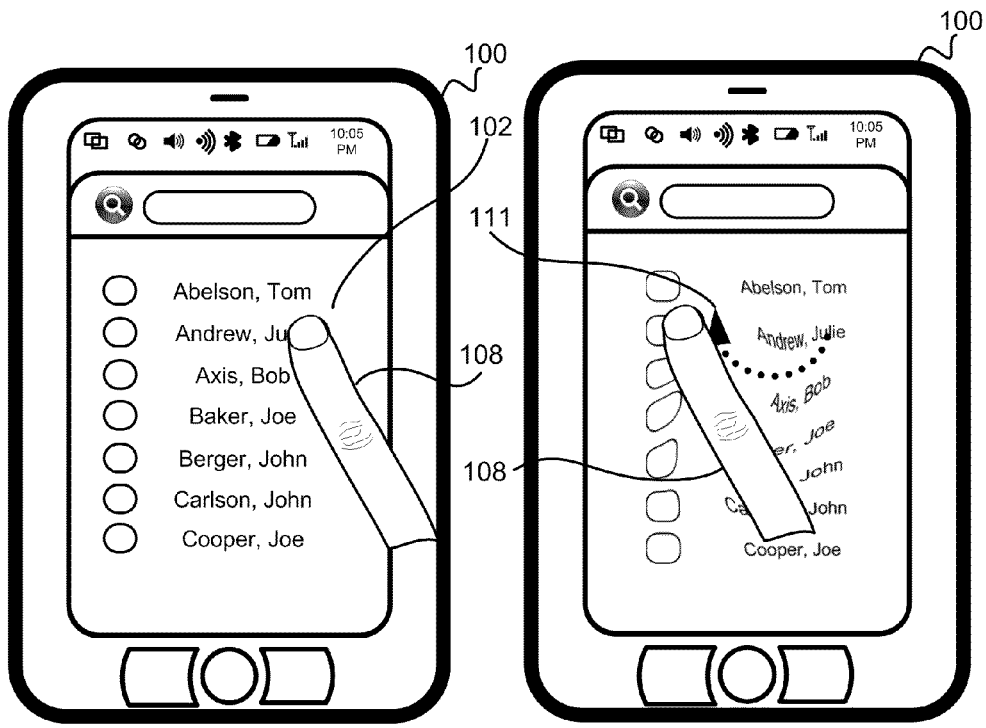
FIGS. 2A-2D are frontal views of a portable computing device illustrating application ending functionality activated by a finger moving in a clockwise direction on a touchscreen display.
Figures 2C, 2D:
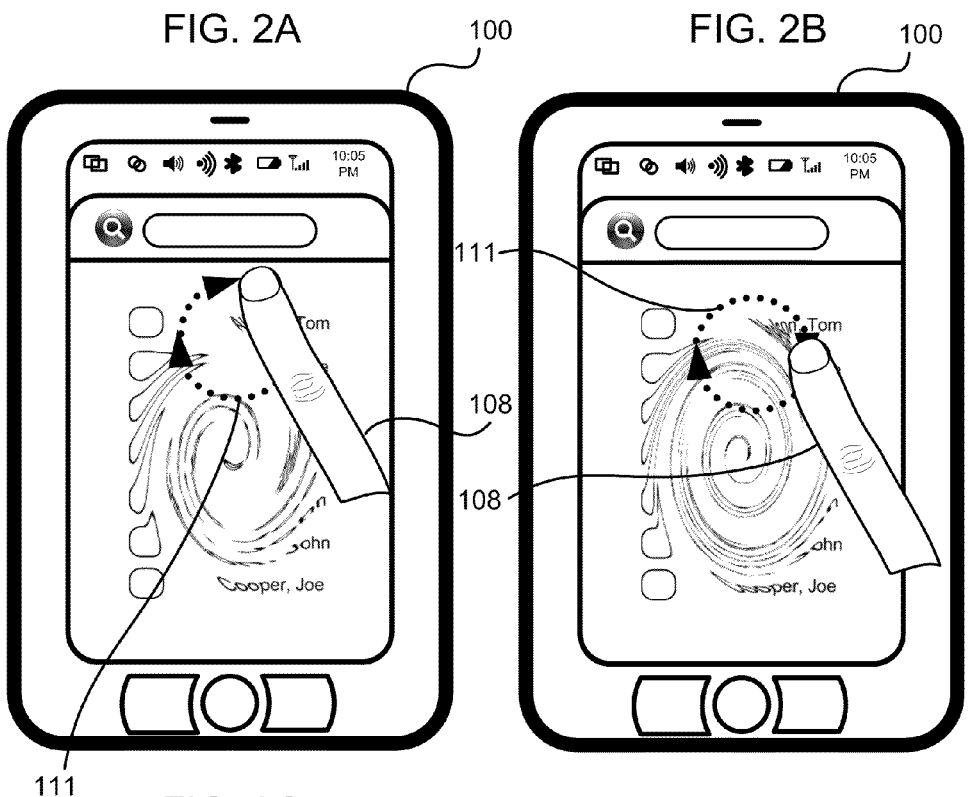

FIG. 2A illustrates the starting position of the finger 108 as the finger 108 touches the touchscreen 102. The touch of a finger 108 to the touchscreen 102 is referred to herein sometimes as a "touch down" event. FIG. 2B illustrates an example of the swirling effect that may be initiated as the user traces a path with a rotation angle larger than 180° and smaller than 360° on the touchscreen display shown in FIG. 1. As the user continues tracing the circular path beyond 180° the image contortion increases and a more advanced swirl results as illustrated in FIGS. 2B-2D. The dotted lines 111 in FIGS. 2B-2C illustrate the progress of the finger 108 as it traces a closed shape by touching the touchscreen 102. The increasing image distortion serves to indicate the approaching end of the application.

It should be noted that FIGS. 2A-2D also illustrate how the display image may appear when the user pauses while tracing a path without lifting the finger off of the touchscreen. Pausing the trace stops the swirling function at the current swirl state. A user may then continue to towards ending the application by continuing to trace the circular path on the touchscreen display 102 which will be indicated by increasing swirl distortions. A user may also back trace which may be reflected in decreasing swirl distortions (i.e., unwinding the swirl) to indicate that the user is backing away from ending the application.

Figure 3:
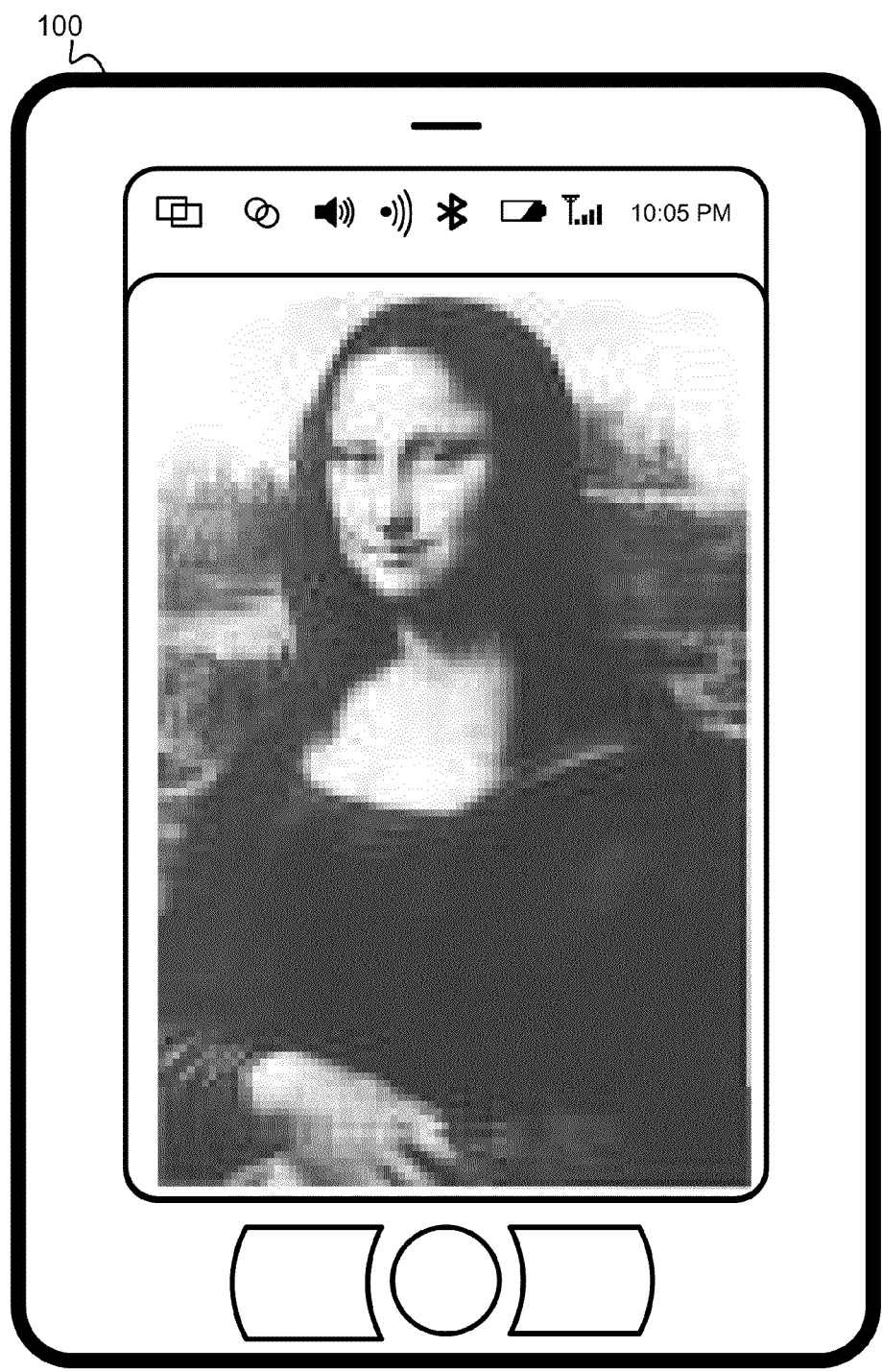
FIG. 3 is a frontal view of a portable computing device illustrating a return to home display after activating the application ending functionality.

Once the maximum rotation angle, such as a full circle, is traced on the touchscreen display 102, the application end functionality may terminate the present application and return to the home display as illustrated in FIG. 3 which shows a home display comprising a Mona Lisa image.

The example embodiment illustrated in FIGS. 1-3 links the application ending function to a clockwise ellipsoidal path. However, the application ending function can also be activated by tracing a counterclockwise ellipsoidal path as illustrated in FIG. 4.

Figure 4:
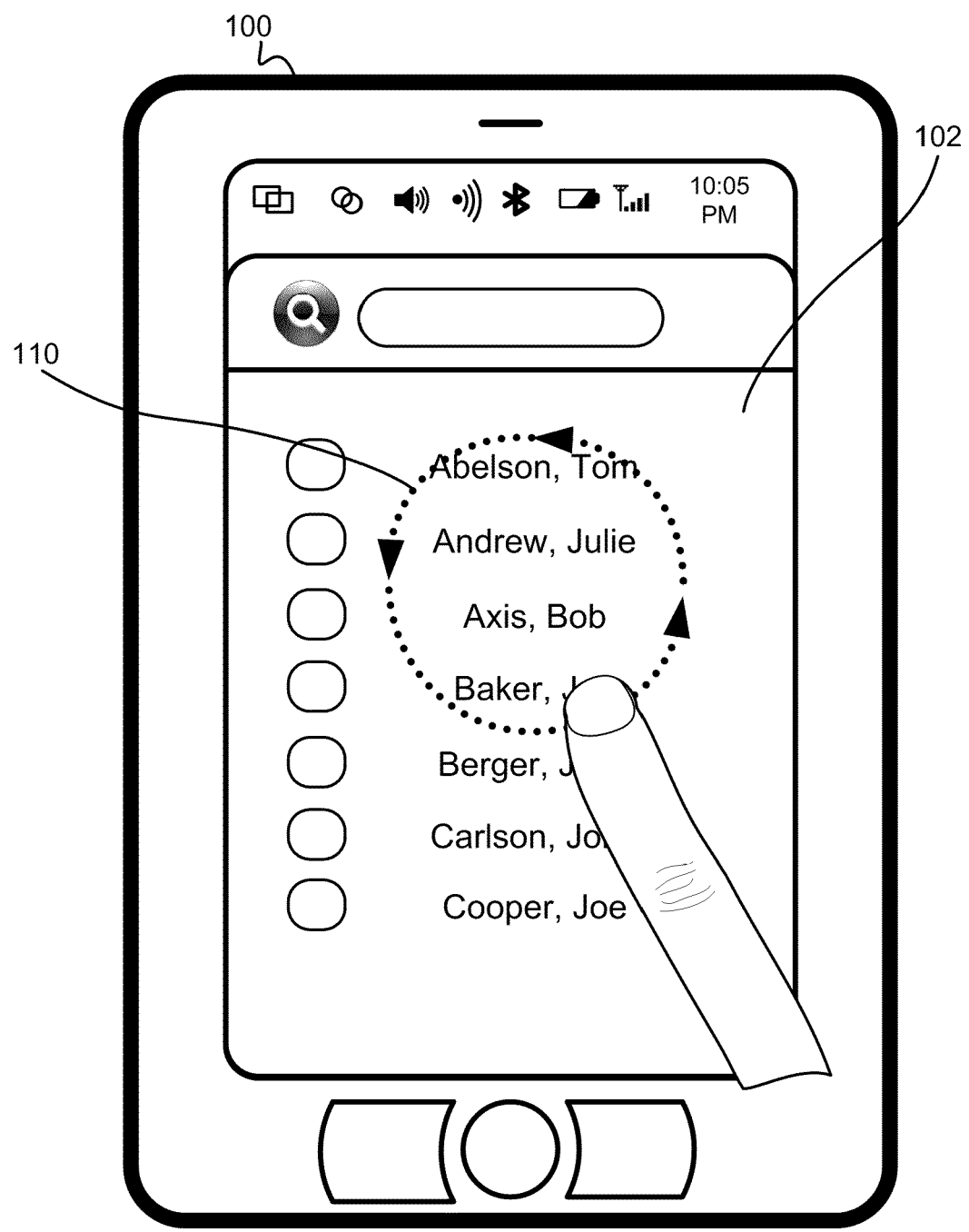
FIG. 4 is a frontal view of a portable computing device illustrating application ending functionality activated by a finger moving in a counterclockwise direction on a touchscreen display.

In a further embodiment, the application ending function may be configured to minimize an application instead of ending it when a user tracing a circular path in the counterclockwise direction as shown in FIG. 4. In contrast to a closed or terminated application, a minimized application continues to reside in memory or potentially perform operations in the background. A user can return to a minimized application at the same state as when the application was minimized. In this embodiment, to minimize the application without terminating it, a user touches the touchscreen 102 using, for example, a finger 108 and, while touching the surface, traces a circular or ellipsoidal path in the counterclockwise direction as shown by the dotted circle 110.

Figure 5A:
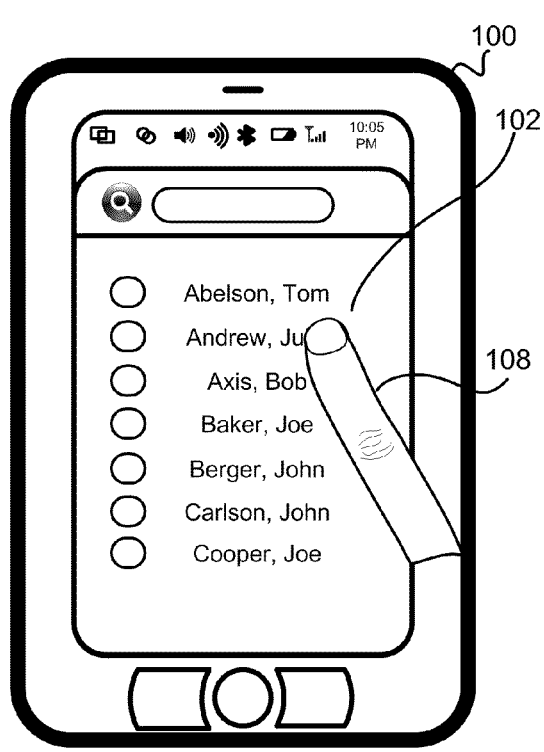
FIGS. 5A-5D are frontal views of a portable computing device illustrating application ending functionality when deactivated by lifting the finger from the touchscreen display.
Figure 5B:
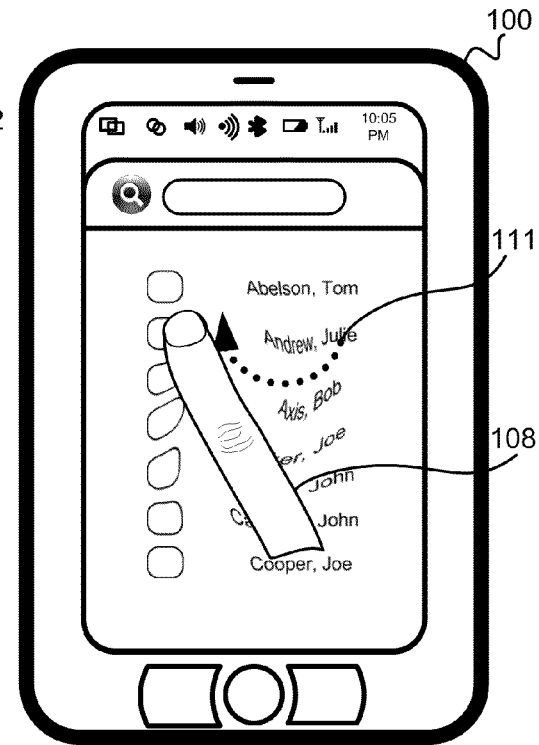
Figure 5C:
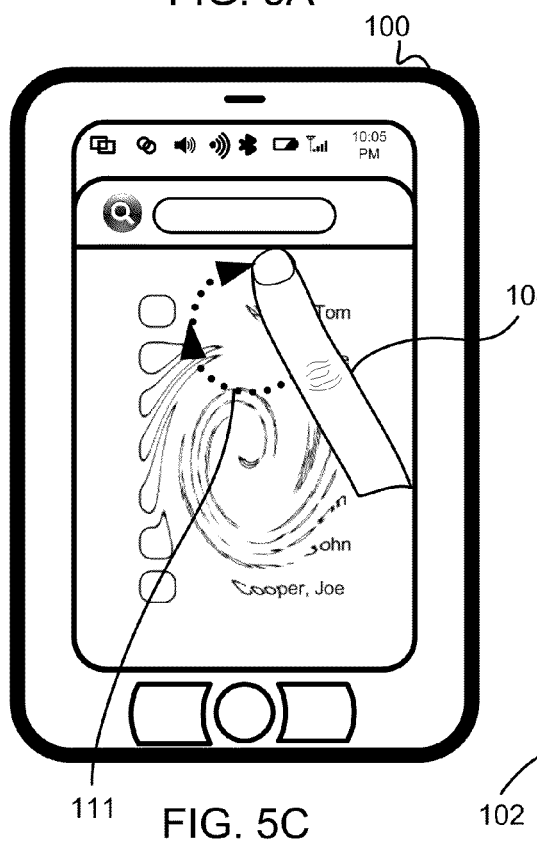
Figure 5D:
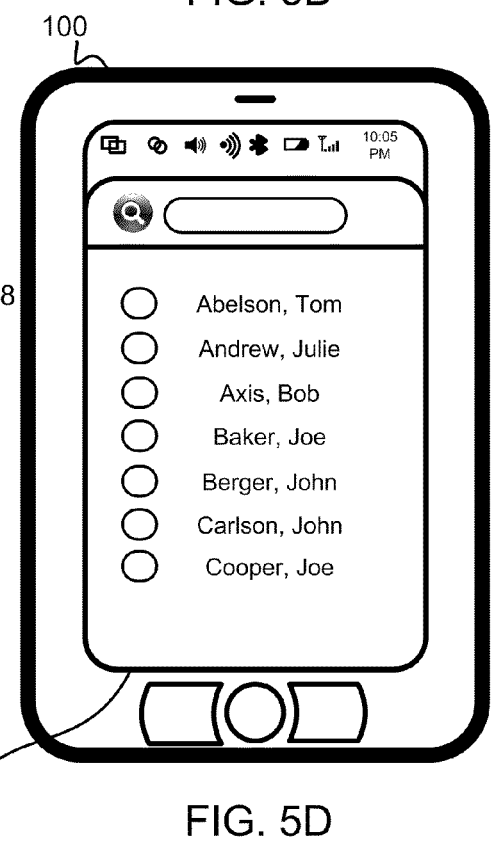

As mentioned above, the application ending function may be configured to abort when the user lifts his/her finger off of the touchscreen before the maximum rotation angle is achieved as is illustrated in FIGS. 5A-5D. FIG. 5A illustrates the starting position of finger 108 as it comes into contact with the touchscreen 102 (at touch down event). FIG. 5B shows an image of a present application display being transformed into a swirl as the user's finger 108 traces a path event pasted a half circle. The dotted lines 111 in FIGS. 5B-5D illustrate the progress of the finger 108 in tracing a closed-shape on the touchscreen 102. FIG. 5B-5C illustrate the progression of the swirl transformation as the user continues tracing of a path towards a full circle. However, if the user lifts his/her finger 108 off the touchscreen display 102 before completing a full circle, such as at the position illustrated in FIG. 5C, the application ending function is aborted and the present application display (i.e., the contact names in the address book) is returned to normal as illustrated in FIG. 5D.

Figure 6:
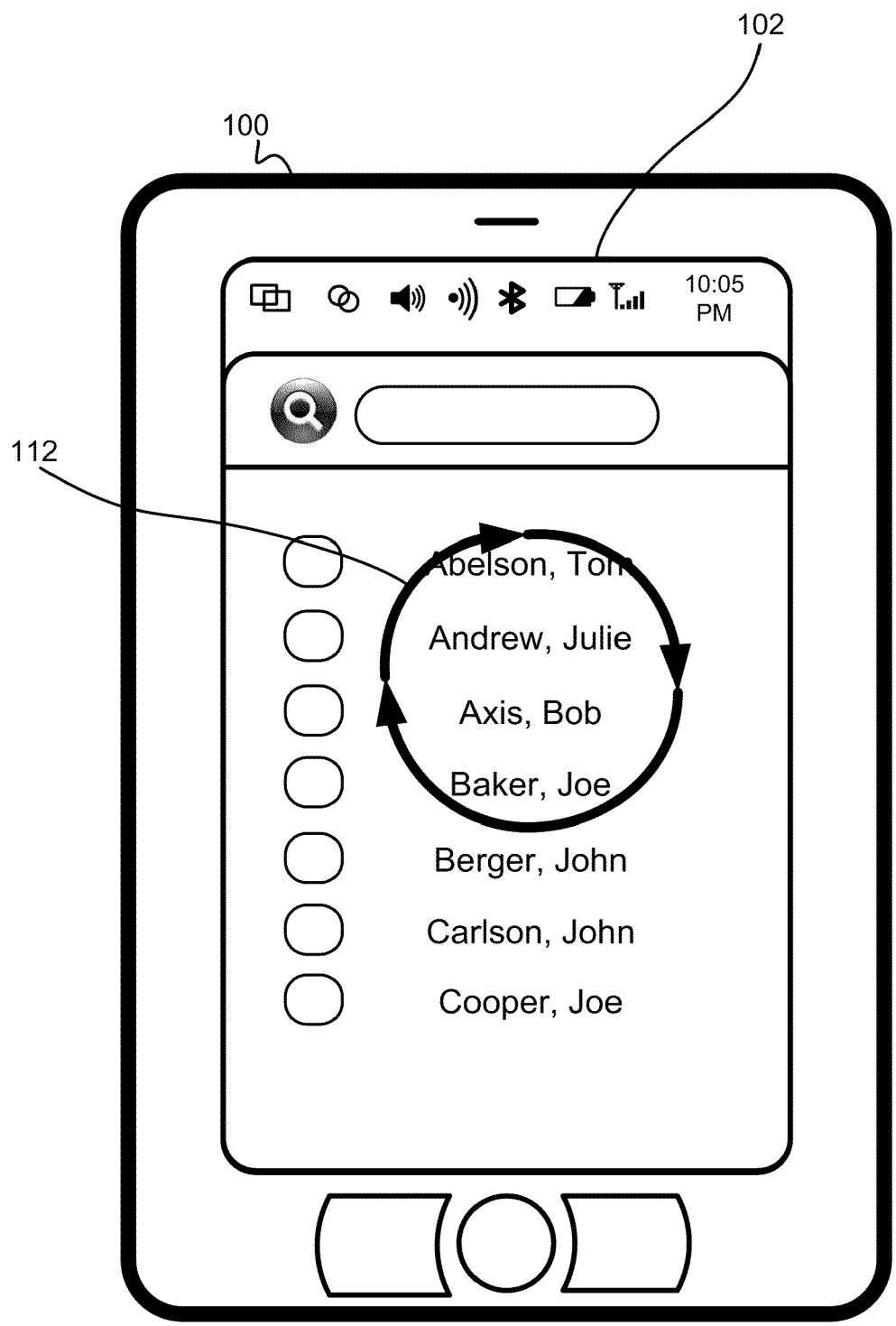
FIG. 6 is frontal view of a portable computing device illustrating application ending function display aides that may be presented on a touchscreen display.

In an alternative embodiment, the application ending function within the GUI may be configured to display a visual aid within the GUI display to assist the user in tracing a closed path. For example, as illustrated in FIG. 6, when the application ending function is activated (e.g., by an arc shaped traced path) a guide wheel 112 may be presented on the touchscreen display 102 to illustrate the shape that the user can trace to end the present application.

The GUI may be configured so the guide wheel 112 is displayed in response to a number of different triggers. In one implementation, a guide wheel 112 may appear on the touchscreen display 102 in response to the touch of the user's finger. In this case, the guide wheel 112 may appear each time the application ending function is enabled and the user touches the touchscreen display 102. In a second implementation, the guide wheel 112 may appear in response to the user touching and applying pressure to the touchscreen 102 or a touchpad. In this case, just touching the touchscreen 102 (or a touchpad) and tracing a shape will not cause a guide wheel 112 to appear, however, the guide wheel 112 appears if the user touches and presses the touchscreen 102 (or touchpad). In a third implementation, a soft key may be designated which when pressed by the user initiates display of the guide wheel 112. In this case, the user may view the guide wheel 112 on the touchscreen display 102 by pressing the soft key, and then touch the touchscreen to begin tracing the shape of the guide wheel 112 to end the present application and return to home display. In a fourth implementation, the guide wheel 112 may be activated when the GUI detects a continuous path that spans more than 90° or angular rotation but less than the minimum rotation angle. In a fifth implementation, the guide wheel 112 may be activated by voice command as in the manner of other voice activated functions that may be implemented on the portable computing device. In this case, when the user's voice command is received and recognized by the portable computing device 100, the guide wheel 112 is presented on the touchscreen display 102 to serve as a visual aid or guide for the user.

The guide wheel 112 implementation description provided above is only one example of visual aids that may be implemented as part of the application ending functionality. As such, these examples are not intended to limit the scope of the present invention. Further, the application ending functionality may be configured to enable users to change the display and other features of the function based on their individual preferences by using known methods. For example, users may turn off the guide wheel 112 feature or configure the application ending functionality to show a guide wheel 112 only when the user touches and holds a finger in one place on the touchscreen for a period of time, such as more than 5 seconds.

Figure 7:
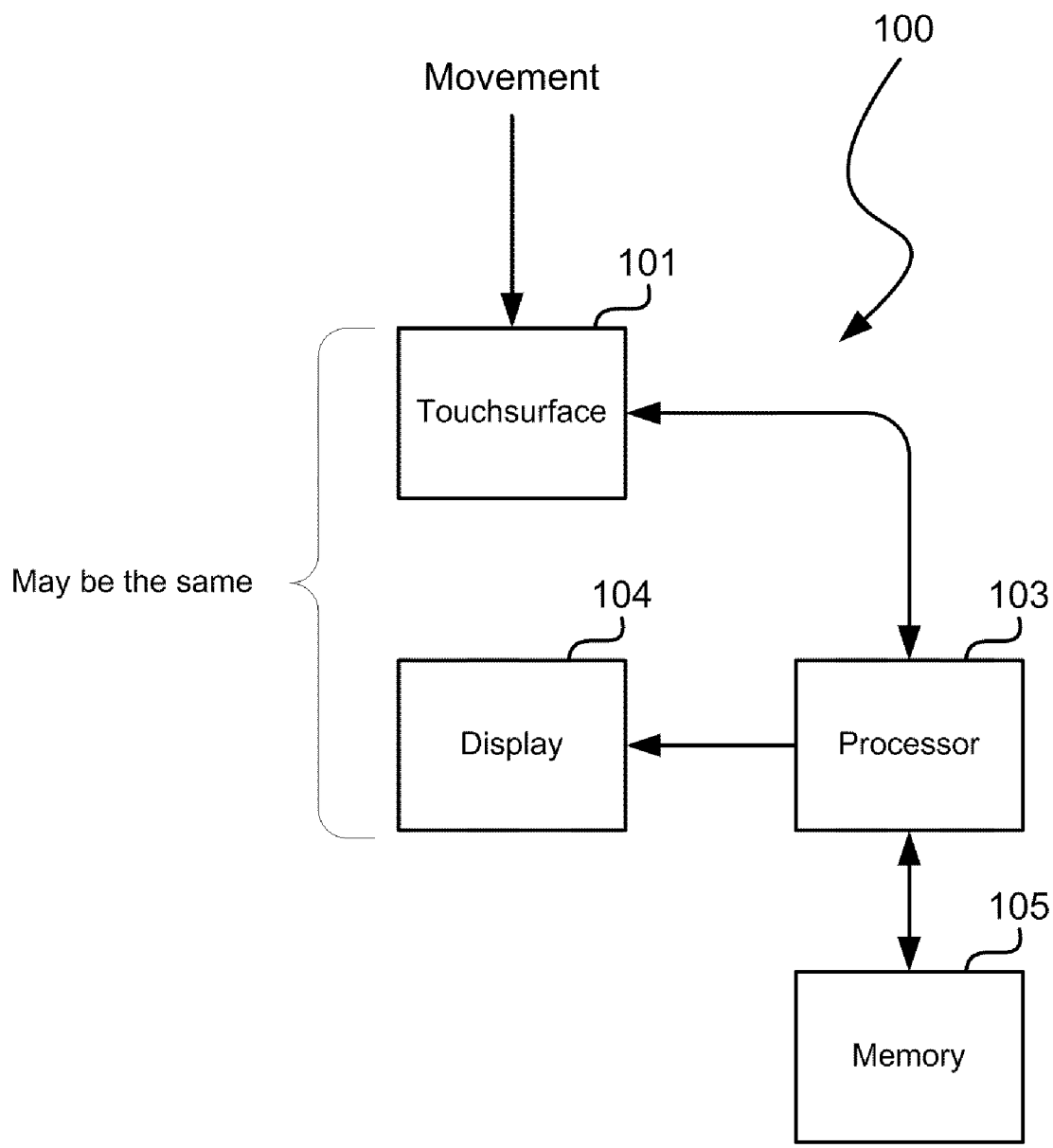
FIG. 7 is a system block diagram of a computer device suitable for use with the various embodiments.

FIG. 7 illustrates a system block diagram of software and/or hardware components of a computing device 100 suitable for use in implementing the various embodiments. The computing device 100 may include a touch surface 101, such as a touchscreen or touchpad, a display 104, a processor 103 and a memory device 105. In some computing devices 100, the touch surface 101 and the display 104 may be the same device, such as a touchscreen 102. Once a touch event is detected by the touch surface 101, information regarding the position of the touch is provided to the processor 103 on a near continuous basis. The processor 103 may be programmed to receive and process the touch information and recognize a single continuous touch event, such as an uninterrupted stream of touch location data received from the touch surface 101. The processor 103 may also be configured to recognize the path traced during a single continuous touch event by, for example, noting the location of the touch at each instant and movement of the touch location over time. Using such information, the processor 103 can determine the traced path length and direction, and from this information recognize a closed path and calculate a rotation angle based upon the path length. The processor 103 can apply the determined rotation angle to provide the user with indications about the progress of the ending function, for example, by generating the appropriate image sent to the display 102. The processor may also be coupled to memory 105 which may be used to store information related touch events, traced paths and image processing data.

Figure 8:
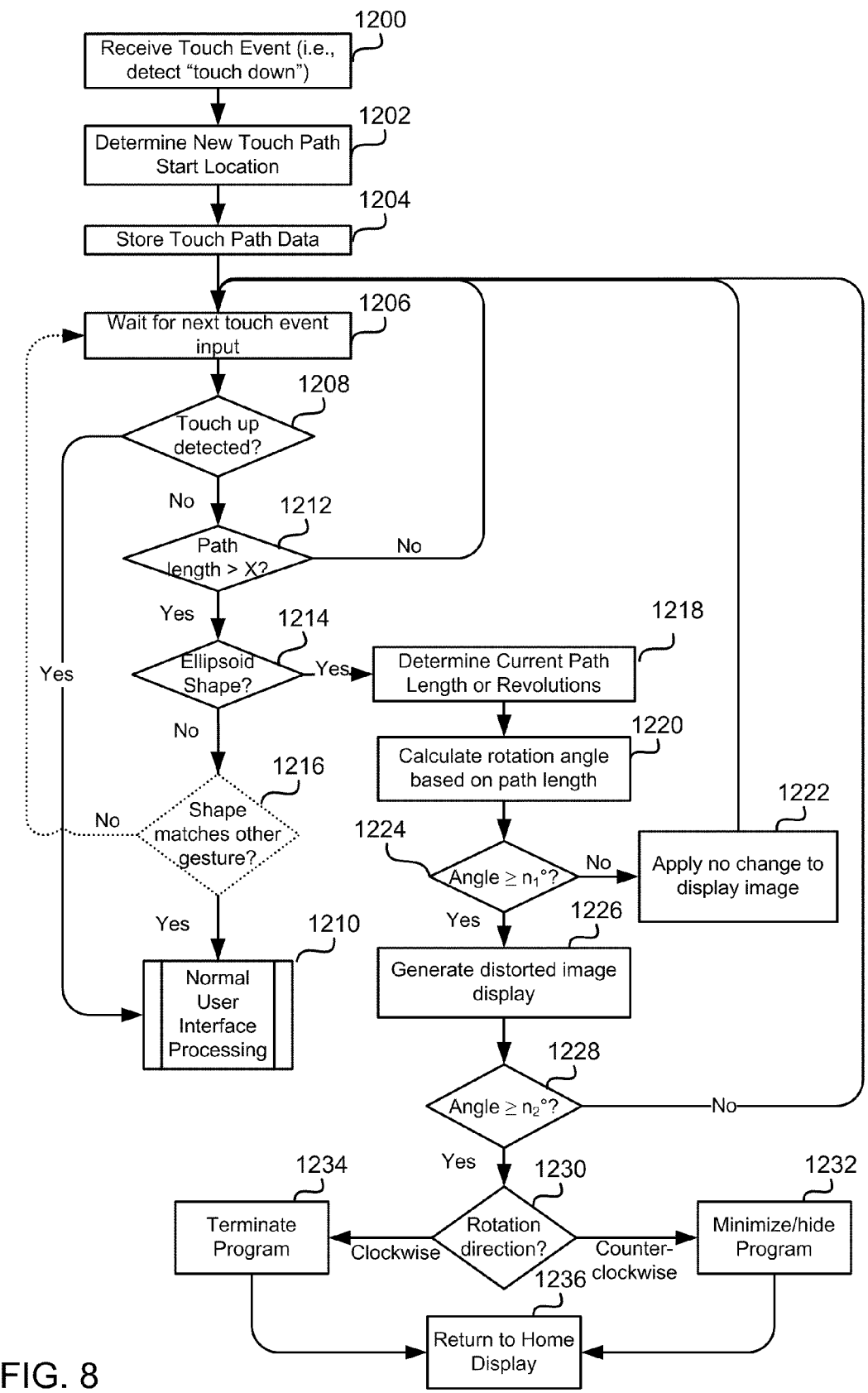
FIG. 8 are process flow diagrams of an embodiment method for implementing an application ending function user interface.
Figure 9:
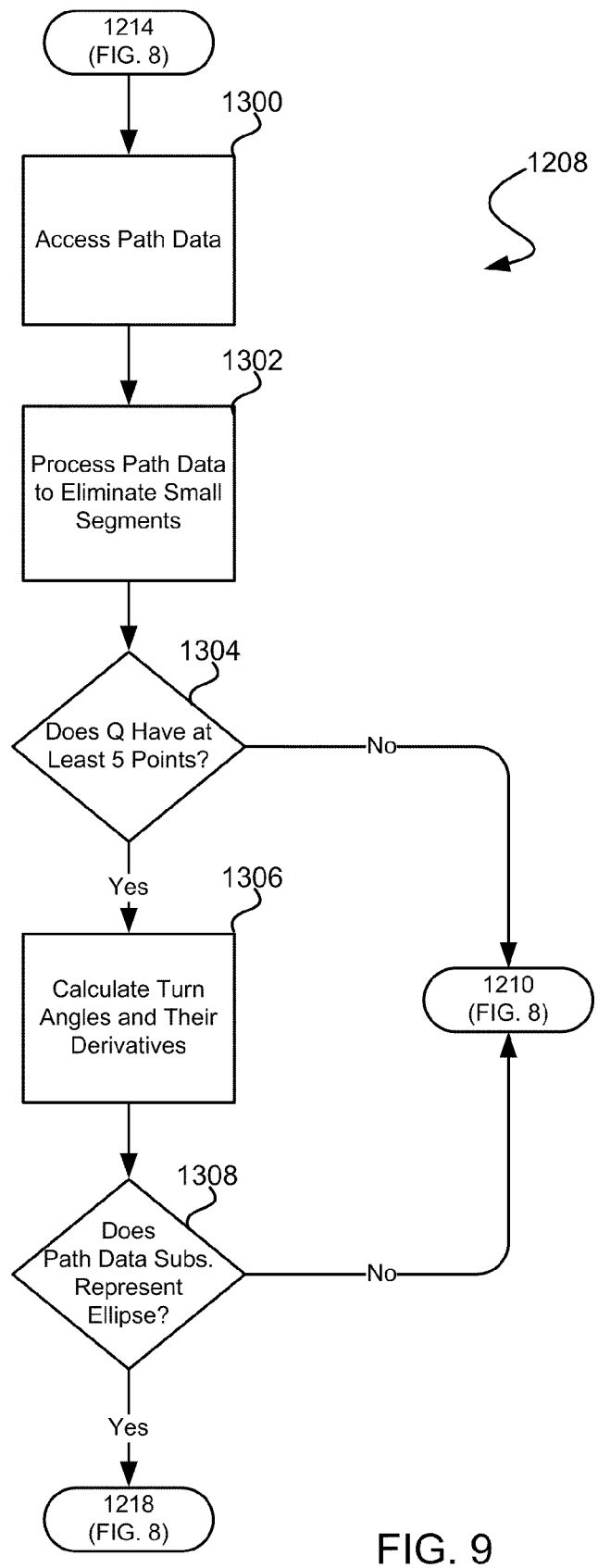
FIG. 9 is a process flow diagram of an embodiment method for determining whether touch data constitutes an ellipsoid shape for implementing the application ending function.

FIGS. 8-9 illustrate an embodiment method for implementing the application ending function on a computing device 100 equipped with a touchscreen 102. The processor 103 of a computing device 100 may be programmed to receive a touch events (i.e., detect a touch down event) from the touchscreen 102, step 1200, such as in the form of an interrupt or message indicating that the touchscreen 102 is being touched. The processor 103 may then determine a new touch path start location, step 1202. The processor 103 may obtain the touch location information from the touchscreen 102 and store the touch location information in memory as touch path data, step 1204. This operation may involve storing the location of the touch in memory in a data structure that the processor 103 can use to determine a traced path length. The processor 103 may wait for next touch event input from the touchscreen, step 1206. The processor 103 may then determine whether the next touch input detects a touch up event (i.e., the user's finger has been lifted and is no longer contacting the touchscreen), determination 1208. If a touch up event is detected (i.e., determination 1208="Yes"), the processor 102 may continue with normal GUI functions.

If the touch input is not a touch up event (i.e., the user's finger is still touching the touchscreen so determination 1208="No"), the processor 103 may determine whether the length of the path that has been traced exceeds a predetermined threshold length "X," determination 1212. The predetermined path length "X" may be used to distinguish traced paths that are long enough for the processor to recognize whether the path appears to be tracing a closed elliptical shape. If the path length is less than the predetermined threshold length (i.e., determination 1212="No"), the processor 103 may wait for and process the next touch path event, returning to step 1206 and repeating the processes of steps 1206-1210. If the path length is greater than the predetermined threshold length (i.e., determination 1212="Yes"), the processor 103 may determine whether the path data follows an ellipsoid shape, determination 1214. This determination may be accomplished by analyzing the stored path data using a geometric algorithm to recognize when a path is tracing an ellipsoidal shape or has circumscribed the center region of the display. Methods for recognizing an ellipse-type gesture input using a pointing device are disclosed in U.S. Pat. No. 5,590,219, the entire contents of which are hereby incorporated by reference. If the path data is determined not to be an ellipsoidal shape (i.e., determination 1214="No"), the processor 103 may continue with normal GUI functions, step 1210, such as image panning or scrolling functions.

Optionally, if the path data is determined not to be an ellipsoidal shape (i.e., determination 1214="No"), the processor may further determine whether the traced shape matches another touchscreen GUI gesture, determination 1216. If the traced path matches another gesture (i.e., determination 1216="Yes"), the processor 103 may continue normal GUI functions to implement the matched gesture. If the traced path is still ambiguous and does not match another gesture (i.e., determination 1216="No"), the processor may wait for the next touch event input, returning to step 1206 and repeating the processes of steps 1206-1210.

If the path data is recognized to be ellipsoidal (i.e., determination 1214="Yes"), the processor 103 may determine the length of the traced path (or the number of revolutions or radians spanned about the display center), step 1218. The processor 103 may also calculate the rotation angle based on the path length, step 1220, and determine whether the calculated rotation angle is equal to or greater than a predetermined first rotation angle threshold value ($n_1°$), determination 1224. If the calculated rotation angle is less than the first rotation angle threshold value $n_1°$ (i.e., determination 1224="No"), the processor 103 may not apply any changes to the display image, step 1222, and may wait for the next touch event input, returning to step 1206 and repeating the processes of steps 1206-1210.

If the calculated rotation angle is equal to or greater than the first threshold value $n_1°$ (i.e., determination 1224="Yes"), the processor 103 may generate a distorted image display, such as by increasing the swirl effect based on the calculated rotation angle, step 1226.

The processor 103 may also determine whether the calculated rotation angle is equal to or greater than a maximum rotation angle second threshold value $n_2°$, determination 1228, which may represent the rotation angle at which the application ending function may end the present application. If the calculated rotation angle is not equal to or greater than the second threshold value $n_2°$ (i.e., determination 1228="No"), the processor 103 may wait for the next touch event input, returning to step 1206 and repeating the processes of steps 1206-1210. If the calculated rotation angle is equal to or greater than the second threshold value $n_2°$ (i.e., determination 1228="Yes"), the processor 103 may complete the operation, such as by terminating the present program, step 1234, and returning to the home display, step 1236.

In an embodiment, the application ending function may enable users to either end the application, as described above, or minimize the application but leave it running in the background and return to the home display. An example method for implementing this embodiment is also illustrated in FIG. 8 in that if the recalculated rotation angle is equal to or greater than $n_2°$ (i.e., determination 1228="Yes"), the processor may alternatively use the path direction information to determine whether the path was traced in the clockwise or counterclockwise direction, determination 1230. If the processor determines that the direction of the path is clockwise (i.e., determination 1230="Clockwise"), the processor 103 may terminate the present application, step 1234, and return to the home display, step 1236, as described above. However, if the processor determines that the direction of the path is counterclockwise (i.e., determination 1230="Counterclockwise"), the processor 103 may minimize or hide the present program, step 1232, and return to home display, step 1236.

It should be noted that instead of calculating the rotational angle and comparing the calculated angle to a first and second angular threshold value, the processor 103 may compare the path length to a first threshold value to determine when to initiate an operation. More generally, the processor 103 may determine a measure of the path, in which the measure may be a path length, spanned radians about a center point of the touch surface, or some other measure of the degree to which the ellipsoid (or other shape) is complete. This measure of the path may be compared to a first threshold value and a second threshold value to determine when to initiate the operation, such as contorting the image, and to complete the operation, such as terminating the present application.

FIG. 9 illustrates an embodiment method for implementing the operations for determining whether a traced path is ellipsoidal in shape included in step 1214 of FIG. 8. The processor may access path data stored in memory, step 1300, and process the data using known methods to eliminate or interpolate among small path segments (i.e. "smooth"), step 1302. Once the small segments have been smoothed, the processor may check to determine whether the smoothed path data includes a series of touch locations Q including at least a minimum number of points, determination 1304, such as a minimum of five points. In alternative embodiments, the minimum number of stroke point array Q may be 3, 10 or more points. If the series of touch locations Q does not include the minimum number of touch points (i.e., determination 1304="No"), the path data processing may continue as if the path is not an ellipsoid-type or is an ambiguous shape, such as with normal GUI processing, step 1210 (FIG. 8). However, if the series of touch locations Q includes the minimum number of points (i.e., determination 1304="Yes"), the processor may calculate the turn angles and the derivatives of the turn angles of the traced path using the path data stored in memory, step 1306. By using known methods, the processor may then determine whether the path data substantially represents an ellipsoid, determination 1308. If the path data does not substantially represent an ellipsoid (i.e., determination 1308="No") the path data is assumed not to constitute an ellipsoid shape and normal GUI processing may continue, step 1218 (FIG. 8). If the path data substantially represents an ellipsoid shape (i.e., determination 1308="Yes"), the process continues to step 1218 described above with reference to FIG. 8.

The figures and the foregoing descriptions address an example embodiment in which a clockwise path trace direction is interpreted as an application termination command and, optionally, a counterclockwise path trace is interpreted as an application minimizing command. However, the invention and the claims encompass an embodiment in which a clockwise path trace is interpreted as an application minimizing command and a counterclockwise path trace is interpreted as an application terminating command. Thus, in this alternative embodiment, when the processor detects an ellipsoidal path with a clockwise rotation the processor calculates a rotation angle and if the rotation angle is equal to or greater than a pre-determined maximum rotation angle it minimizes the present application and returns to the home display, and when the processor detects an ellipsoidal path with a counterclockwise rotation the processor calculates a rotation angle and if the rotation angle is equal to or greater than a predetermined maximum rotation angle it terminates the present application and returns to the home display. In a further embodiment, the application ending function associated with a direction of rotation (i.e., clockwise or counterclockwise) may be selected as a user-selectable option so that the user can determine whether a clockwise rotation results in termination or minimizing if a present application. This may be useful to enable users to configure their computing device according to whether they are left- or right-handed.

The various embodiments are described in the context of activating an application termination or minimizing function; however, the circular gesture with corresponding image contortions may also be used to activate other types of computer and application functions and operations. For example, the gesture may be used to activate a device shutdown operation, initiate a screen saver or battery saver mode, initiating a sleep mode, suspending an application operation (i.e., terminating a present operation of an application without terminating the application itself), or switch to another application. In those cases, the operational functionality of initiating the function when a traced path achieves a minimum length or rotational angle, contorting the display image based upon the length of the path or rotation angle, and completing the function upon achieving a maximum length or rotational angle provide the same user feedback benefits as described above, enabling users to recognize when the corresponding function is about to be activated and to confirm the action by completing the circular motion.

Figure 10:
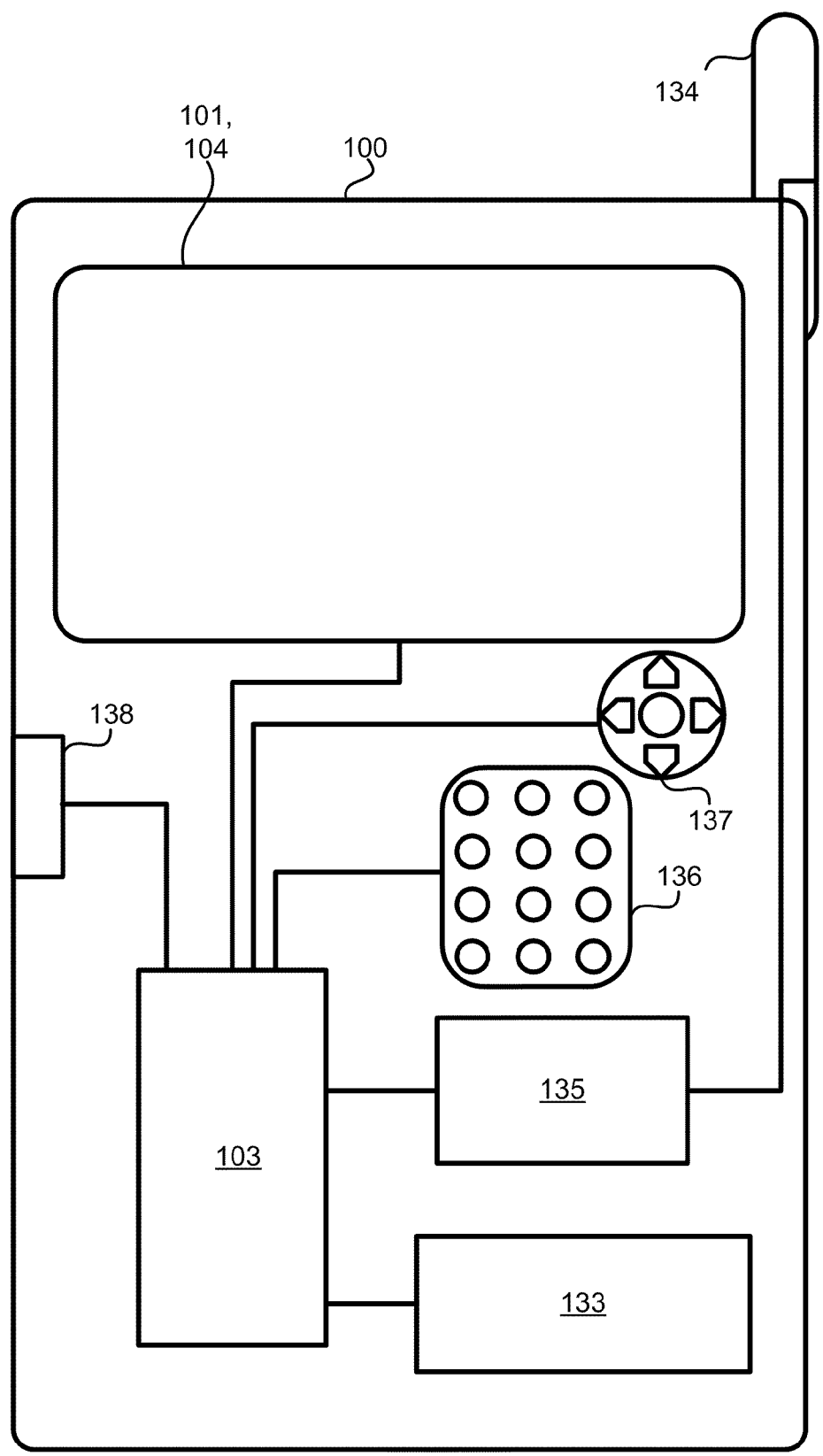
FIG. 10 is a component block diagram of an example portable computing device suitable for use with the various embodiments.

In a further embodiment, the path traced on the touch surface may be shapes other than circular or elliptical, and different functions or operations may correspond to different shapes. For example, a triangular path shape may correspond to a different function, such as shutting down the device or activating a screen or battery saving mode of operation. As another example, a square path shape may correspond to a third function, such as switching to another application or operating mode (e.g., activating the telephone mode). The methods used to implement these further embodiments are substantially the same as described above with reference to FIGS. 8-10 with the exception that the other path shapes are recognized as being different from the circular or elliptical shape.

The embodiments described above may be implemented on any of a variety of portable computing devices 100. Typically, such portable computing devices will have in common the components illustrated in FIG. 10. For example, the portable computing devices 100 may include a processor 103 coupled to internal memory 105 and a touch surface input device 101 or display 104. The touch surface input device 101 can be any type of touchscreen 102, such as a resistive-sensing touchscreen, capacitive-sensing touchscreen, infrared sensing touchscreen, acoustic/piezoelectric sensing touchscreen or the like. The various aspects are not limited to any particular type of touchscreen 102 or touchpad technology. Additionally, the portable computing device 100 may have an antenna 134 for sending and receiving electromagnetic radiation that is connected to a wireless data link and/or cellular telephone transceiver 135 coupled to the processor 103. Portable computing devices 100 which do not include a touchscreen input device 102 (typically including a display 104) typically include a key pad 136 or miniature keyboard and menu selection keys or rocker switches 137 which serve as pointing devices. The processor 103 may further be connected to a wired network interface 138, such as a universal serial bus (USB) or FireWire® connector socket, for connecting the processor 103 to an external touchpad or touch surfaces or external local area network.

In some implementations, a touch surface can be provided in areas of the electronic device 100 outside of the touchscreen 102 or display 104. For example, the keypad 136 can include a touch surface with buried capacitive touch sensors. In other implementations, the keypad 136 may be eliminated so the touchscreen 102 provides the complete GUI. In yet further implementations, a touch surface may be an external touchpad that can be connected to the electronic device 100 by means of a cable to a cable connector 138 or a wireless transceiver (e.g., transceiver 135) coupled to the processor 103.

The processor 103 may be any programmable microprocessor, microcomputer or multiple processor chip or chips that can be configured by software instructions (applications) to perform a variety of functions, including the functions of the various embodiments described above. In some portable computing devices 100, multiple processors 103 may be provided, such as one processor dedicated to wireless communication functions and one processor dedicated to running other applications. The processor may also be included as part of a communication chipset. Typically, software applications may be stored in the internal memory 105 before they are accessed and loaded into the processor 103. In some portable computing devices 100, the processor 103 may include internal memory sufficient to store the application software instructions. For the purposes of this description, the term memory refers to all memory accessible by the processor 103, including internal memory 105 and memory within the processor 103 itself. Application data files are typically stored in the memory 105. In many portable computing devices 100, the memory 105 may be a volatile or nonvolatile memory, such as flash memory, or a mixture of both.

Those of skill in the art would appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the blocks of a method described above and shown in the figures is for example purposes only as the order of some blocks may be changed from that described herein without departing from the spirit and scope of the present invention and the claims.

The blocks of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or computing device. In the alternative, the processor and the storage medium may reside as discrete components in a user terminal or computing device. Additionally, in some aspects, the blocks and/or actions of a method or algorithm may reside as one or any combination or set of codes and/or instructions on a machine readable medium and/or computer readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein, and instead the claims should be accorded the widest scope consistent with the principles and novel features disclosed herein.

What is claimed is:

1. A method for initiating a function on a computing device, comprising:
   detecting a path event on a touch sensitive input device;
   determining whether the path event traces an ellipsoidal shape;
   determining a measure of the path event when the path event traces an ellipsoidal shape, wherein the measure of the path is a rotational angle based upon a length of the path;
   determining a rotational direction of the path event;
   initiating an operation corresponding to the ellipsoid path event when the determined measure of the path exceeds a first threshold value;
   displaying a contorted image as part the initiated operation by generating a display of the present application display that is contorted in the form of a swirl, wherein the degree of swirl depends upon the measure of the path; and
   completing the operation when the determined measure of the path exceeds a second threshold value, wherein completing the operation further comprises:
      terminating an application and returning to home display when the rotational direction of the path event is determined to be in a first direction; and
      minimizing the application and returning to a home display when the rotational direction of the path event is determined to be in a second direction.

2. The method of claim 1, further comprising:
   displaying an ellipsoidal shaped visual aid on the display.

3. The method of claim 1, further comprising:
   displaying an ellipsoidal shaped visual aid on the display in response to determining that the path event traces an ellipsoidal shape.

4. The method of claim 1, further comprising:
   determining whether the path event traces a triangular shape;
   determining a measure of the path event when the path event traces a triangular shape; and
   initiating a second operation corresponding to the triangular path event when the determined measure of the path exceeds a first threshold value;
   displaying a contorted image as part the initiated operation; and
   completing the second operation when the determined measure of the path exceeds a second threshold value.

5. The method of claim 1, further comprising:
   determining whether the path event traces a square shape;
   determining a measure of the path event when the path event traces a square shape; and
   initiating a third operation corresponding to the square path event when the determined measure of the path exceeds a first threshold value;
   displaying a contorted image as part the initiated operation; and
   completing the third operation when the determined measure of the path exceeds a second threshold value.

6. A computing device, comprising:
   a processor; and
   a touchscreen display coupled to the processor,
   wherein the processor is configured with processor-executable instructions to perform operations comprising:
      detecting a path event on a touch sensitive input device;
      determining whether the path event traces an ellipsoidal shape;
      determining a measure of the path event when the path event traces an ellipsoidal shape, wherein the measure of the path is a rotational angle based upon a length of the path;
      determining a rotational direction of the path event;
      initiating an operation corresponding to the ellipsoid path event when the determined measure of the path exceeds a first threshold value;
      displaying a contorted image as part the initiated operation by generating a display of the present application display that is contorted in the form of a swirl, wherein the degree of swirl depends upon the measure of the path; and
      completing the operation when the determined measure of the path exceeds a second threshold value, wherein completing the operation further comprises:
         terminating an application and returning to home display when the rotational direction of the path event is determined to be in a first direction: and
         minimizing the application and returning to home display when the rotational direction of the path event is determined to be in a second direction.

7. The computing device of claim 6, wherein the processor is configured with processor-executable instructions to perform further operations comprising:
   displaying an ellipsoidal shaped visual aid on the display.

8. The computing device of claim 6, wherein the processor is configured with processor-executable instructions to perform further operations comprising:
   displaying an ellipsoidal shaped visual aid on the display in response to determining that the path event traces an ellipsoidal shape.

9. The computing device of claim 6, wherein the processor is configured with processor-executable instructions to perform further operations comprising:
   determining whether the path event traces a triangular shape;
   determining a measure of the path event when the path event traces a triangular shape; and
   initiating a second operation corresponding to the triangular path event when the determined measure of the path exceeds a first threshold value;
   displaying a contorted image as part the initiated operation; and
   completing the second operation when the determined measure of the path exceeds a second threshold value.

10. The computing device of claim 6, wherein the processor is configured with processor-executable instructions to perform further operations comprising:
   determining whether the path event traces a square shape;
   determining a measure of the path event when the path event traces a square shape; and
   initiating a third operation corresponding to the square path event when the determined measure of the path exceeds a first threshold value;
   displaying a contorted image as part the initiated operation; and
   completing the third operation when the determined measure of the path exceeds a second threshold value.

11. A computing device, comprising:
   means for detecting a path event on a touch sensitive input device;
   means for determining whether the path event traces an ellipsoidal shape;
   means for determining a measure of the path event when the path event traces an ellipsoidal shape, wherein the measure of the path is a rotational angle based upon a length of the path;
   means for determining a rotational direction of the path event;
   means for initiating an operation corresponding to the ellipsoid path event when the determined measure of the path exceeds a first threshold value;
   means for displaying a contorted image of the present application display as part the initiated operation in the form of a swirl in which the degree of swirl depends upon the measure of the path; and
   means for completing the operation when the determined measure of the path exceeds a second threshold value, wherein the means for completing the operation further comprises:
      means for terminating an application and returning to home display when the rotational direction of the path event is determined to be in a first direction; and
      means for minimizing the application and returning to a home display when the rotational direction of the path event is determined to be in a second direction.

12. The computing device of claim 11, further comprising:
   means for displaying an ellipsoidal shaped visual aid on the display.

13. The computing device of claim 11, further comprising:
   means for displaying an ellipsoidal shaped visual aid on the display in response to determining that the path event traces an ellipsoidal shape.

14. The computing device of claim 11, further comprising:
   means for determining whether the path event traces a triangular shape;
   means for determining a measure of the path event when the path event traces a triangular shape; and
   means for initiating a second operation corresponding to the triangular path event when the determined measure of the path exceeds a first threshold value;
   means for displaying a contorted image as part the initiated operation; and
   means for completing the second operation when the determined measure of the path exceeds a second threshold value.

15. The computing device of claim 11, further comprising:
   means for determining whether the path event traces a square shape;
   means for determining a measure of the path event when the path event traces a square shape; and
   means for initiating a third operation corresponding to the square path event when the determined measure of the path exceeds a first threshold value;
   means for displaying a contorted image as part the initiated operation; and
   means for completing the third operation when the determined measure of the path exceeds a second threshold value.

16. A non-transitory computer-readable storage medium having stored thereon computer-executable instructions configured to cause a processor to perform operations comprising:
   detecting a path event on a touch sensitive input device;
   determining whether the path event traces an ellipsoidal shape;
   determining a measure of the path event when the path event traces an ellipsoidal shape, wherein the measure of the path is a rotational angle based upon a length of the path;
   determining a rotational direction of the path event;
   initiating an operation corresponding to the ellipsoid path event when the determined measure of the path exceeds a first threshold value;
   displaying a contorted image as part the initiated operation by generating a display of the present application display that is contorted in the form of a swirl, wherein the degree of swirl depends upon the measure of the path; and
   completing the operation when the determined measure of the path exceeds a second threshold value, wherein the stored computer-executable instructions are configured to cause the processor to perform operations such that completing the operation further comprises:
      terminating an application and returning to home display when the rotational direction of the path event is determined to be in a first direction; and
      minimizing the application and returning to a home display when the rotational direction of the path event is determined to be in a second direction.

17. The non-transitory computer-readable storage medium of claim 16, wherein the computer-executable instructions are configured to cause the processor to perform operations further comprising:
   displaying an ellipsoidal shaped visual aid on the display.

18. The non-transitory computer-readable storage medium of claim 16, wherein the stored computer-executable instructions are configured to cause the processor to perform operations further comprising:
   displaying an ellipsoidal shaped visual aid on the display in response to determining that the path event traces an ellipsoidal shape.

19. The non-transitory computer-readable storage medium of claim 16, wherein the stored computer-executable instructions are configured to cause the processor to perform operations further comprising:
   determining whether the path event traces a triangular shape;
   determining a measure of the path event when the path event traces a triangular shape; and
   initiating a second operation corresponding to the triangular path event when the determined measure of the path exceeds a first threshold value;
   displaying a contorted image as part the initiated operation; and completing the second operation when the determined measure of the path exceeds a second threshold value.

20. The non-transitory computer-readable storage medium of claim 16, wherein the stored computer-executable instructions are configured to cause the processor to perform operations further comprising:

determining whether the path event traces a square shape;

determining a measure of the path event when the path event traces a square shape; and initiating a third operation corresponding to the square path event when the determined measure of the path exceeds a first threshold value;

displaying a contorted image as part the initiated operation; and completing the third operation when the determined measure of the path exceeds a second threshold value.

* * * * *